United States Patent
Goodman et al.

(10) Patent No.: US 9,529,552 B2
(45) Date of Patent: Dec. 27, 2016

(54) STORAGE RESOURCE PACK MANAGEMENT

(71) Applicant: INTERNATIONAL BUSINESS MACHINES CORPORATION, Armonk, NY (US)

(72) Inventors: Daniel I. Goodman, Beit Shemesh (IL); Ran Harel, Kfar-Saba (IL); Rivka M. Matosevich, Zichron-Ya'acov (ID); Orit Nissan-Messing, Hod HaSharon (IL); Yossi Siles, Tel-Mond (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 82 days.

(21) Appl. No.: 14/155,132

(22) Filed: Jan. 14, 2014

(65) Prior Publication Data

US 2015/0199221 A1 Jul. 16, 2015

(51) Int. Cl.
*G06F 12/02* (2006.01)
*G06F 12/00* (2006.01)
*G06F 3/06* (2006.01)

(52) U.S. Cl.
CPC ..................................... *G06F 3/067* (2013.01)

(58) Field of Classification Search
CPC ................ G06F 12/0246; G06F 11/108; G06F 17/30362; G06F 12/023; G06F 12/0253; G06F 12/1009; G06F 3/067; G06F 12/0238; G06F 21/6218
See application file for complete search history.

(56) References Cited

U.S. PATENT DOCUMENTS

| | | | |
|---|---|---|---|
| 7,065,616 B2 | 6/2006 | Gajjar et al. | |
| 7,089,381 B2 | 8/2006 | Horn et al. | |
| 7,376,786 B2 | 5/2008 | Williams | |
| 7,644,136 B2 * | 1/2010 | Rose | G06F 3/0613 709/217 |
| 7,657,613 B1 | 2/2010 | Hanson et al. | |
| 7,797,468 B2 | 9/2010 | Shin et al. | |
| 7,945,640 B1 | 5/2011 | Vantine | |
| 8,156,306 B1 * | 4/2012 | Raizen et al. | 711/202 |
| 8,341,119 B1 | 12/2012 | Roussos et al. | |

(Continued)

OTHER PUBLICATIONS

Casalicchio et al., Autonomic resource provisioning in cloud systems with availability goals, Aug. 2013, 10 pages.*

(Continued)

*Primary Examiner* — Thuy Dao
(74) *Attorney, Agent, or Firm* — Griffiths & Seaton PLLC

(57) ABSTRACT

Methods, apparatus and computer program products implement embodiments of the present invention that include identifying, by a first computer in communication with a storage system having one or more storage devices, storage resources on the storage system, and defining multiple resource packs, each of the resource packs comprising respective multiple attributes for the storage resources. In response to an inventory request from a second computer in communication with the first computer, each of the resource packs can be conveyed to the second computer. Additionally, upon receiving, from the second computer, an allocation request to allocate a portion of a given resource pack, the portion of the given resource pack can be allocated in response to the request.

6 Claims, 3 Drawing Sheets

(56) References Cited

U.S. PATENT DOCUMENTS

| | | | |
|---|---|---|---|
| 8,402,118 B2 | 3/2013 | Finnegan et al. | |
| 8,478,845 B2 | 7/2013 | Agarwala et al. | |
| 8,578,127 B2 * | 11/2013 | Thatcher | G06F 3/0604 711/103 |
| 8,601,222 B2 * | 12/2013 | Flynn | G06F 11/1048 711/103 |
| 8,930,668 B2 * | 1/2015 | Engle | G06F 3/067 711/170 |
| 9,253,166 B2 * | 2/2016 | Gauda | G06F 21/6218 |
| 9,292,431 B2 * | 3/2016 | Thatcher | G06F 3/0604 |
| 2007/0233868 A1 | 10/2007 | Tyrrell et al. | |
| 2008/0313414 A1 | 12/2008 | Shackelford | |
| 2009/0240880 A1 | 9/2009 | Kawaguchi | |
| 2010/0138605 A1 | 6/2010 | Kazar et al. | |
| 2010/0306467 A1 | 12/2010 | Pruthi et al. | |
| 2011/0022642 A1 | 1/2011 | Demilo et al. | |
| 2011/0131443 A1 | 6/2011 | Laor et al. | |
| 2012/0198073 A1 | 8/2012 | Srikanth et al. | |
| 2012/0198190 A1 | 8/2012 | Hart et al. | |
| 2013/0067164 A1 | 3/2013 | Velayudhan et al. | |
| 2013/0111471 A1 | 5/2013 | Chandrasekaran | |
| 2013/0117448 A1 | 5/2013 | Nahum et al. | |
| 2013/0246922 A1 | 9/2013 | Doerr et al. | |
| 2014/0280668 A1 * | 9/2014 | Brown | G06F 3/0605 709/213 |

OTHER PUBLICATIONS

Hacker et al., Flexible resource allocation for reliable virtual cluster computing systems, Nov. 2011, 12 pages.*

Kang et al., Virtual Allocation: A Scheme for Flexible Storage Allocation, Oct. 13, 2004, 6 pages, Proceedings of the OASIS workshop in conjunction with ASPLOS, Association for Computing Machinery, Washington DC, Texas A&M University, Boston, MA.

A System and Method for Providing Meta-data Model Based Distributed Data, Feb. 3, 2012.

Method and System for Extracting Meta-data for Interactions over Collaborative Applications, Aug. 26, 2010.

Papazoglou et al., "Blueprinting the cloud." pp. 74-79, IEEE 15.6 (2011), Internet Computing.

* cited by examiner

STORAGE RESOURCE PACK MANAGEMENT

CROSS-REFERENCE TO RELATED APPLICATIONS

This application is related to U.S. patent application titled "Matching Storage Resource Packs to Storage Services", filed on even date with the present application, and which is incorporated herein by reference.

FIELD OF THE INVENTION

The present invention relates generally to data storage, and specifically to defining and managing storage resource packs that can be used in cloud computing environments.

BACKGROUND

In cloud computing environments, infrastructure as a service (also known as IaaS) comprises a standardized, highly automated offering, where computing resources are owned and hosted by a service provider, and offered to customers on demand. In an IaaS model, the service provider delivers the underlying infrastructure, including network, storage, compute resources and virtualization technology.

The description above is presented as a general overview of related art in this field and should not be construed as an admission that any of the information it contains constitutes prior art against the present patent application.

SUMMARY

There is provided, in accordance with an embodiment of the present invention a method, including identifying, by a first computer in communication with a storage system having one or more storage devices, storage resources on the storage system, defining multiple resource packs, each of the resource packs comprising respective multiple attributes for the storage resources, and conveying each of the resource packs to a second computer in communication with the first computer.

There is also provided, in accordance with an embodiment of the present invention a storage facility, including a storage system having one or more storage devices, and a first computer in communication with the storage system, and configured to identify storage resources on the storage system, to define multiple resource packs, each of the resource packs comprising respective multiple attributes for the storage resources, and to convey each of the resource packs to a second computer in communication with the first computer.

There is further provided, in accordance with an embodiment of the present invention a computer program product, the computer program product including a non-transitory computer readable storage medium having computer readable program code embodied therewith, the computer readable program code including computer readable program code executing on a first computer in communication with a storage system having one or more storage devices configured to identify storage resources on the storage system, computer readable program code configured to define multiple resource packs, each of the resource packs comprising respective multiple attributes for the storage resources, and computer readable program code configured to convey each of the resource packs to a second computer in communication with the first computer.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Embodiments of the present invention provide methods and systems for defining and managing resource packs in a storage facility configured to deliver infrastructure as a service solutions. In embodiments of the present invention, the service comprises storage resources that can be provided to a cloud computing environment. As described hereinbelow, the storage facility may comprise a storage system having a management module (also referred to herein as a first computer) in communication with a cloud management server (also referred to herein as a second computer) that provides an interface between the storage system and clients comprising front-end computing platforms in the cloud computing environment.

In embodiments described herein, the management module can identify storage resources on the storage system, and define multiple resource packs, each of the resource packs comprising respective multiple attributes for the storage resources. In some embodiments, upon receiving a resource pack inventory request from the cloud management server, the management module can convey each of the resource packs to the cloud management server. In additional embodiments, upon receiving, from the cloud management server, an allocation request to allocate a given resource pack, the management module can allocate a resource pack in response to the request. In further embodiments, upon receiving, from the cloud management server, a request to restore a given resource pack, the management module can restore the given resource pack to the available resource packs.

Figure 1:
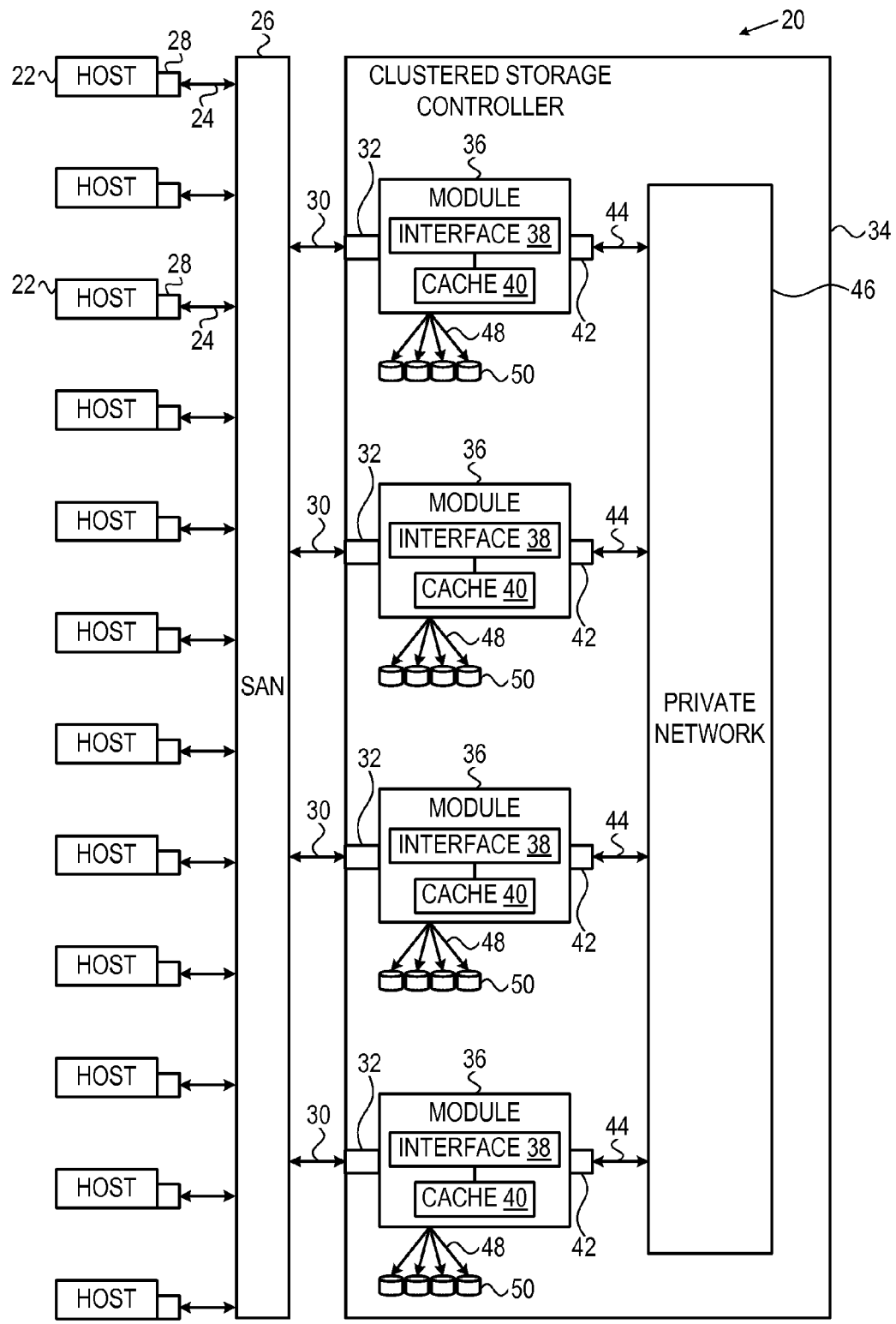
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
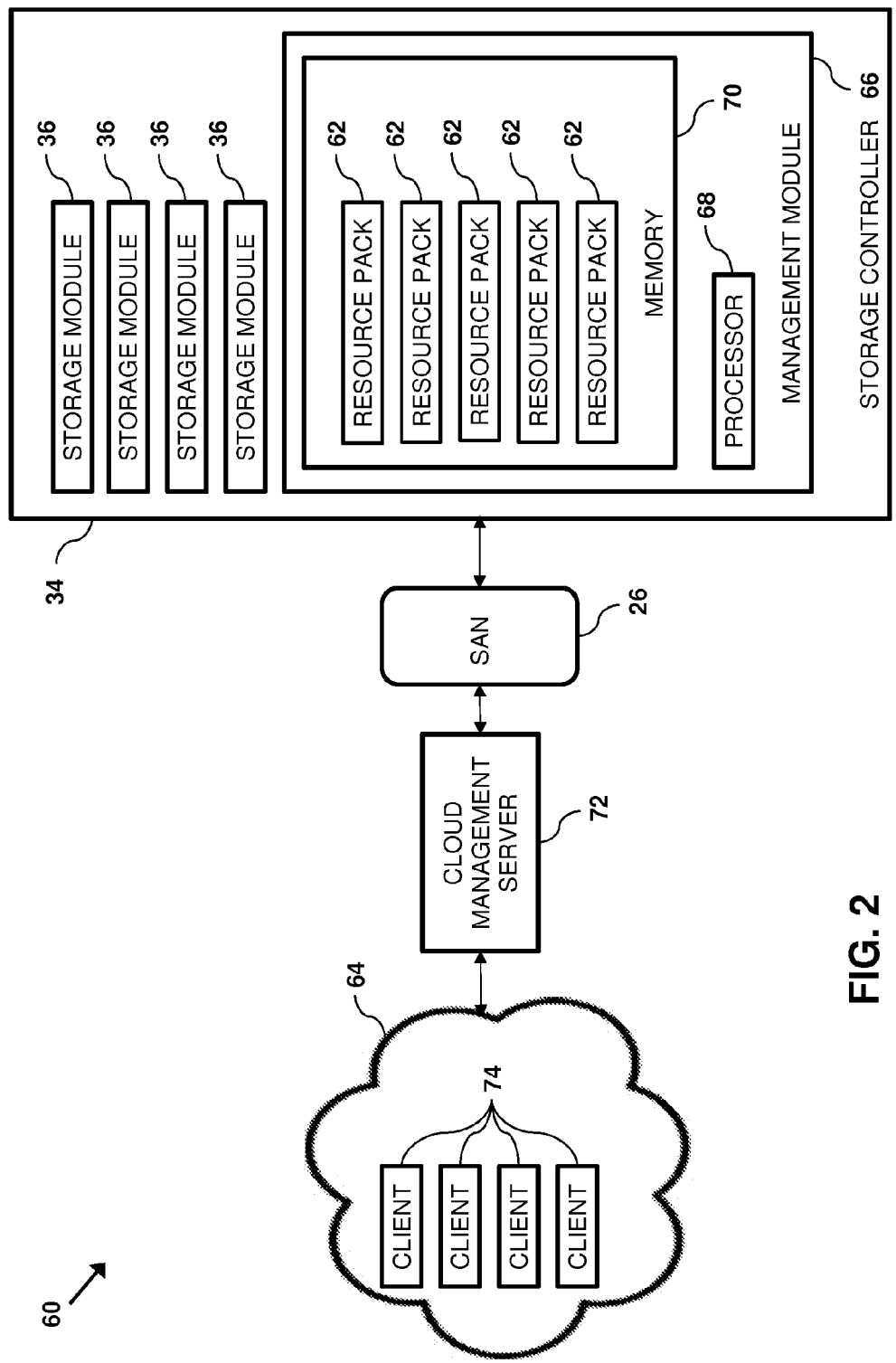
FIG. 2 is a block diagram of a storage facility configured to manage storage resource packs, in accordance with an embodiment of the present invention.

FIG. 2 is a block diagram showing a storage facility 60 that is configured to provide storage resource packs 62 to a cloud computing environment 64, in accordance with an embodiment of the present invention. As explained hereinbelow, each resource pack 62 comprises multiple attributes (i.e., metadata) that define a pool of storage resources comprising storage space on storage devices 50.

In addition to modules 36 (also referred to herein as storage modules 36), storage controller 34 comprises a management module 66 comprising a processor 68 and a memory 70 configured to store resource packs 62. A cloud management computer 72 in communication with storage controller 34 via SAN provides an interface between the storage controller and cloud clients 74 in cloud 64, thereby enabling the clients to access, via the resource packs, storage resources on the storage controller.

While embodiments herein describe management module 66 defining and managing resource packs 62, defining and managing the resource packs by any other computer in storage subsystem 20 or facility 60 is considered to be within the spirit and scope of the present invention. For example, the resource packs can be defined and managed by a given host computer 22, a given module 36 or cloud management server 72.

In operation, storage controller 34 comprises a set of storage resources, and each resource pack 62 comprises multiple attributes for a subset of the set of storage resources. Examples of attributes that can be included in resource packs 62 include, but are not limited to, storage identification attributes, storage configuration attributes, cost attributes and credentials attributes.

Storage identification attributes comprise metadata identifying hardware in storage controller 34, such as:

- A unique identifier for storage controller 34. In some embodiments, storage facility 60 may comprise multiple storage controllers 34, and the unique identifier can identify a given storage controller associated with a given subset of the storage resources.
- A manufacturer of storage controller 34. In some embodiments, storage facility 60 may comprise storage controllers 34 from different hardware vendors.
- A model number for storage controller 34.

Storage configuration attributes comprise metadata indicating storage capacity, performance and redundancy. Storage configuration attributes include, but are not limited to:

- Storage media type. Examples of storage media types include, but are not limited to slow hard drives, fast hard drives and solid state drives (SSDs).
- Maximum capacity.
- Current capacity.
- Mirroring type (i.e., synchronous or asynchronous).
- A maximum number of synchronous mirrors
- A current number of synchronous mirrors.
- Whether or not snapshots are being used.
- Whether or not space efficient snapshots are being used.
- A maximum number of snapshots.
- Storage pool type. Storage pools typically comprise thin storage pools and thick storage pools.
- A minimum number of input/output operations per second (IOPS).
- A current average of IOPS.
- Whether or not data compression is being used.
- Redundant Array of Independent Disks (RAID) level.

Cost attributes can indicate chargeback parameters (i.e., a storage cost), and the credentials parameters may comprise login and/or authentication information, such as a user name and a password that enables a given client 74 in cloud 64 to securely access storage resources in facility 60.

In some embodiments, the resource pack can be defined manually by a storage administrator who can delegate the described storage resources to a storage provisioning management system. In operation, the status of the described resources can be continually reflected in the resource pack via dynamic attributes such as "available capacity" or "available mirrors".

Processor 68 and cloud management server 72 typically comprise general-purpose computer, which are programmed in software to carry out the functions described herein. The software may be downloaded to management module 66 and cloud management server 72 in electronic form, over a network, for example, or it may be provided on non-transitory tangible media, such as optical, magnetic or electronic memory media. Alternatively, some or all of the functions of processor 68 and/or cloud management server 72 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Resource Pack Management

Figure 3:
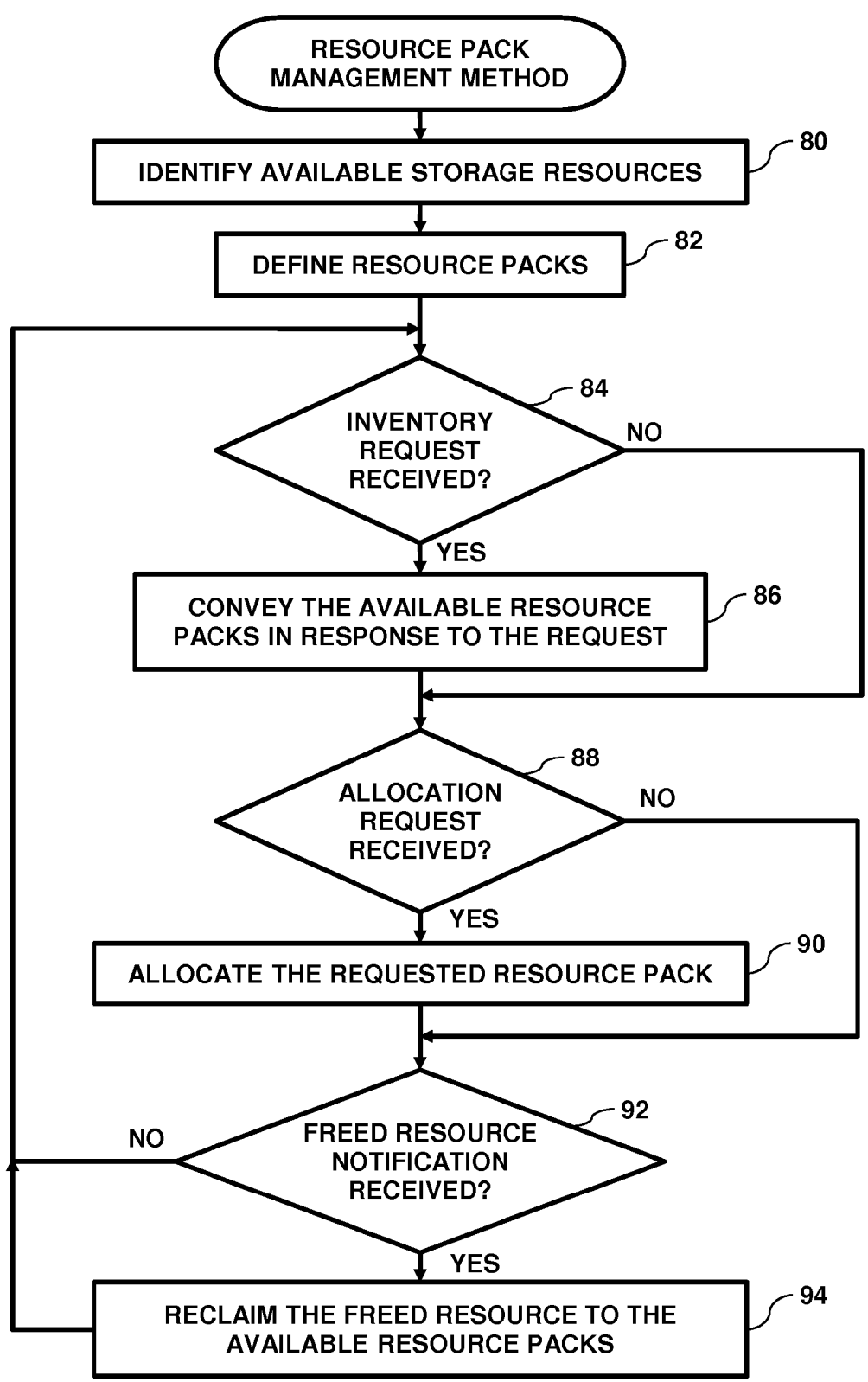
FIG. 3 is a flow diagram that schematically illustrates a method of managing storage resource packs, in accordance an embodiment of the present invention.

FIG. 3 is a flow diagram that schematically illustrates a method of managing resource packs 62, in accordance with an embodiment of the present invention. In an initial step 80, processor 68 identifies available storage resources on storage controller 34, and defines resource packs 62 in a definition step 82. As described supra, each resource pack 62 comprises attributes for storage resources on storage controller 34.

In a first comparison step 84, if processor 68 receives a resource pack inventory request from cloud management server 72, then in a response step 86, the processor identifies one or more of resource packs 62 that are currently available (i.e., not yet allocated), and conveys the one or more identified resource packs to cloud management server 72 in response to the request. In an alternative embodiment, processor 68 can perform step 86 at specific intervals (e.g., every five minutes) and "broadcast" the one or more identified resource packs to cloud management server 72 and/or any other computer on SAN 26.

In a second comparison step 88, if processor 68 receives, from cloud management server 72, a request to allocate a portion of a given available resource pack 62, then the processor allocates the portion of the given resource pack to the cloud management server in an allocation step 90. In some embodiments, cloud management server 72 maintains mapping information for storage resources on the storage system. The mapping information comprises mappings between the clients and storage resources on the storage controller. In operation, processor 68 can convey an allocation indication (i.e., for the allocated portion of the given resource pack) to the cloud management server upon allocating the portion of the given resource pack to the cloud management server, and the cloud management server can update the mapping information in response to receiving the allocation indication.

In operation, cloud management server 72 is in communication with storage controller 34 and the clients in cloud 64. In other words, the clients in the cloud are typically not in direct communication with the storage controller when requesting storage resources from the storage controller. Therefore, if a given client 74 in the cloud requires storage resources, then the given client can convey a resource pack request to cloud management server 72, and the cloud management server can communicate with storage controller 34 to acquire the resource pack for the given client.

In some embodiments, cloud management server can identify an operating environment of the given client that conveyed the request. Typically, each operating environment has its own unique "language" that it uses to issue storage management requests. In operation, when responding to the request, cloud management server 72 can convey the response in the "language" of the identified operating environment, thereby providing transparent multi-tenancy to multiple operating environments executing on clients 74 in cloud 64.

Examples of operating environments in cloud 64 that can communicate with storage controller 34 via cloud management server 72 include, but are not limited to Microsoft Windows™ which is produced by Microsoft Corporation, Redmond Wash., and hypervisors implementing storage virtualization such as ESX™ or ESXi™, which are produced by VMware Inc., Palo Alto Calif.

In a third comparison step 92, if processor 68 receives a request to free an allocated portion of a given resource pack 62 (also referred to herein as a freed resource notification) that was previously allocated to a given client 74 in cloud 64, then the processor reclaims the allocated portion of the given resource pack in the given resource pack in a restore step 94, and the method continues with step 84. In other words, if a given client 68 no longer needs given storage resources, the given client conveys a freed resource notification to processor 68, the processor restores (i.e., reclaims) the freed resource to the appropriate resource pack 62 and conveys an updated mapping to the cloud management server.

Returning to step 92, if processor 68 does not receive a restore request, then the method continues with step 84. Returning to step 88, if processor 68 does not receive an allocation request, then the method continues with step 92. Returning to step 84, if processor 78 does not receive an inventory request, then the method continues with step 92.

As described supra, while embodiments herein describe processor 68 managing resource packs 62 by performing the steps in the flow diagram, managing the resource packs by any other computer in storage subsystem 20 or facility 60 is considered to be within the spirit and scope of the present invention. For example, the resource packs can be managed by a given host computer 22, a given module 36 or cloud management server 72.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method, comprising:

identifying, by ha first computer locally and internally and in communication with a storage system having one or more storage devices, storage resources on the storage system;

receiving, by the first computer from a second computer located externally to the storage system, a resource pack inventory request;

defining multiple available resource packs based on the resource pack inventory request, each of the available resource packs comprising respective multiple attributes for the storage resources;

conveying each of the available resource packs to the second computer in communication with the first computer;

receiving, by the first computer, a request from the second computer to allocate portion of the available resource pack;

allocating, by the first computer, the portion of the available resource pack to the second computer;

maintaining, by the second computer, mapping information for storage resources on the storage system, and updating the mapping information upon allocating the portion of the available resource pack; and receiving, from the second computer and to the first computer, a request to free an allocated portion of the available resource pack, and reclaiming, by the first computer, the allocated portion in the available resource pack.

2. The method according to claim 1, wherein the attributes are selected from a list consisting of storage identification attributes, storage configuration attributes, cost attributes and credentials parameters.

3. A storage facility, comprising:

a storage system having one or more storage devices; and a first computer in communication with the storage system, and configured:

to identify, locally and internally, storage resources on the storage system, to receive, by the first computer from a second computer located externally to the storage system, a resource pack inventory request;

to define multiple available resource packs based on the resource pack inventory request, each of the available resource packs comprising respective multiple attributes for the storage resources, to convey each of the available resource packs to the second computer in communication with the first computer, to receive, by the first computer, a request from the second computer to allocate portion of the available resource pack;

to allocate, by the first computer, the portion of the available resource pack to the second computer;

to maintain, by the second computer, mapping information for storage resources on the storage system, and updating the mapping information upon allocating the portion of the available resource pack; and to receive, from the second computer and to the first computer, a request to free an allocated portion of the available resource pack, and reclaiming, by the first computer, the allocated portion in the available resource pack.

4. The storage facility according to claim 3, wherein the attributes are selected from a list consisting of storage identification attributes, storage configuration attributes, cost attributes and credentials parameters.

5. A computer program product, the computer program product comprising:

a non-transitory computer readable storage medium having computer readable program code embodied therewith, the computer readable program code comprising:

computer readable program code executing on a first computer in communication with a storage system having one or more storage devices configured to identify, locally and internally, storage resources on the storage system;

computer readable program code configured to receive, by the first computer from a second computer located externally to the storage system, a resource pack inventory request;

computer readable program code configured to define multiple available resource packs based on the resource pack inventory request, each of the available resource packs comprising respective multiple attributes for the storage resources;

computer readable program code configured to convey each of the available resource packs to the second computer in communication with the first computer;

computer readable program code configured to receive, by the first computer, a request from the second computer to allocate portion of the available resource pack;

computer readable program code configured to allocate, by the first computer, the portion of the available resource pack to the second computer;

computer readable program code configured to maintain, by the second computer, mapping information for storage resources on the storage system, and updating the mapping information upon allocating the portion of the available resource pack; and computer readable program code configured to receive, from the second computer and to the first computer, a request to free an allocated portion of the available resource pack, and to reclaim, by the first computer, the allocated portion in the available resource pack.

6. The computer program product according to claim 5, wherein the attributes are selected from a list consisting of storage identification attributes, storage configuration attributes, cost attributes and credentials parameters.

* * * * *